(12) United States Patent
Yoshida

(10) Patent No.: US 10,217,202 B2
(45) Date of Patent: Feb. 26, 2019

(54) IMAGE PROCESSING APPARATUS, IMAGE CAPTURING APPARATUS, AND STORAGE MEDIUM

(71) Applicant: CANON KABUSHIKI KAISHA, Tokyo (JP)

(72) Inventor: Akimitsu Yoshida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/939,629

(22) Filed: Mar. 29, 2018

(65) Prior Publication Data

US 2018/0218483 A1 Aug. 2, 2018

Related U.S. Application Data

(63) Continuation of application No. 15/238,193, filed on Aug. 16, 2016, now Pat. No. 9,959,605.

(30) Foreign Application Priority Data

Aug. 19, 2015 (JP) ................................ 2015-161901

(51) Int. Cl.
| | |
|---|---|
| *G06K 9/40* | (2006.01) |
| *G06T 5/20* | (2006.01) |
| *H04N 5/232* | (2006.01) |
| *G06T 5/00* | (2006.01) |
| *H04N 5/217* | (2011.01) |

(52) U.S. Cl.
CPC ................ *G06T 5/20* (2013.01); *G06T 5/003* (2013.01); *H04N 5/217* (2013.01); *H04N 5/232* (2013.01); *H04N 5/23235* (2013.01)

(58) Field of Classification Search
CPC ............ G06T 5/20; G06T 5/003; H04N 5/217
See application file for complete search history.

(56) References Cited

U.S. PATENT DOCUMENTS

| | | | | |
|---|---|---|---|---|
| 9,888,177 | B2 * | 2/2018 | Yachi | ........................ G01C 3/06 |
| 2004/0090538 | A1 * | 5/2004 | Kadohara | ............ H04N 5/3572 |
| | | | | 348/230.1 |
| 2008/0309777 | A1 * | 12/2008 | Aoyama | ............ G06K 9/00228 |
| | | | | 348/222.1 |

(Continued)

FOREIGN PATENT DOCUMENTS

| | | |
|---|---|---|
| JP | 2012-073691 A | 4/2012 |
| JP | 2014-150423 A | 8/2014 |

*Primary Examiner* — Gregory M Desire
(74) *Attorney, Agent, or Firm* — Cowan, Liebowitz & Latman, P.C.

(57) ABSTRACT

An image processing apparatus acquires a first image generated by image capturing, stores data about an image restoration filter that is used for an image restoration process and corresponds to a first F-number, stores interpolation data corresponding to each of a plurality of second F-numbers different from the first F-number, which relates to an interpolation proportion in an interpolation process, and generates, when an image capturing F-number as the F-number for the image capturing is one of the second F-numbers, a second image by performing for the first image a correction process that includes the image restoration process and the interpolation process, by using the image restoration filter corresponding to the first F-number and the interpolation data corresponding to the image capturing F-number.

12 Claims, 8 Drawing Sheets

(56) References Cited

U.S. PATENT DOCUMENTS

2012/0206627 A1\* 8/2012 Reshidko ........... G02B 13/0045
348/240.2
2013/0188154 A1\* 7/2013 Tomioka .............. G03B 21/008
353/31

\* cited by examiner

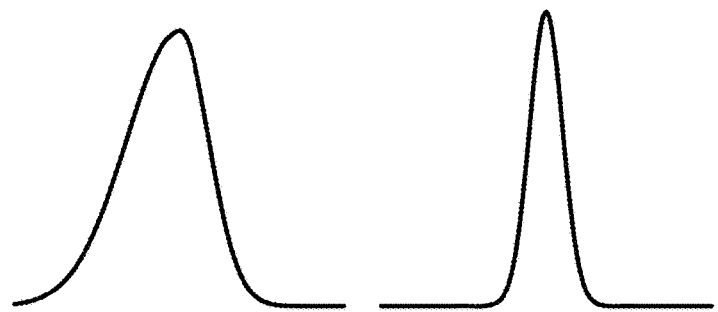
FIG. 4A  FIG. 4B
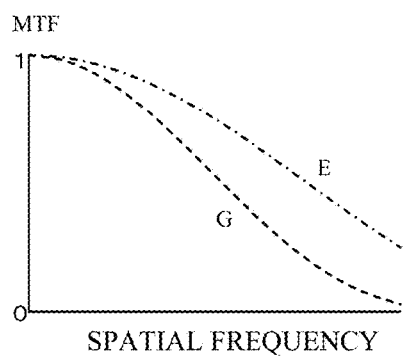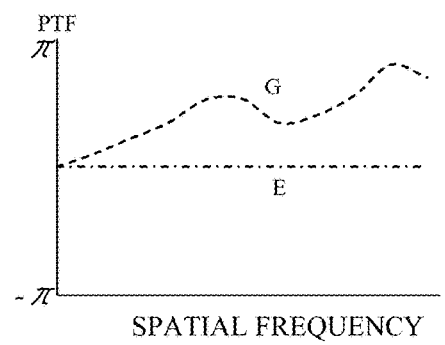
FIG. 5A  FIG. 5B
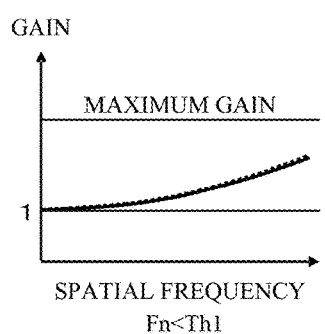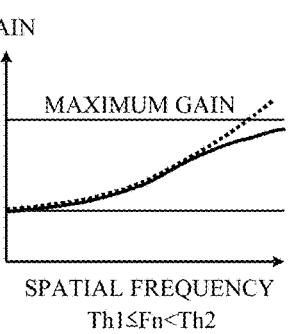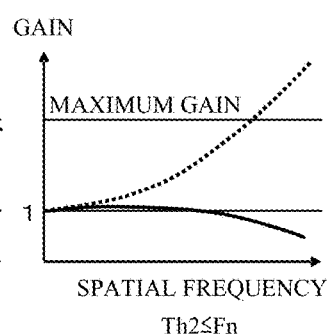
FIG. 6A  FIG. 6B  FIG. 6C

IMAGE PROCESSING APPARATUS, IMAGE CAPTURING APPARATUS, AND STORAGE MEDIUM

CROSS-REFERENCE TO RELATED APPLICATION

This application is a continuation of application Ser. No. 15/238,193, filed Aug. 16, 2016, the entire disclosure of which is hereby incorporated by reference.

BACKGROUND OF THE INVENTION

Field of the Invention

The present invention relates to an image processing technology configured to perform image processing for an image generated by image capturing.

Description of the Related Art

An image obtained by an image capturing apparatus, such as a digital camera, may deteriorate (blur) due to diffractions generated by an diaphragm (in particular, a small diaphragm aperture), even when a variety of aberrations are well corrected, such as a spherical aberration, a coma, a curvature of field, and an astigmatism of an image capturing optical system. FIG. 2 illustrates a diffraction limit curve. In FIG. 2, an abscissa axis denotes a spatial frequency, and an ordinate axis denotes a modulation transfer function ("MTF"). As an F-number increases (as a diaphragm aperture diameter reduces), a cutoff frequency shifts to a low frequency side. For instance, a Nyquist frequency of an image sensor with a pixel size of 4 μm is 125 lp (line pair)/mm. Thus, the influence of the diffraction reduces at a small F-number such as F2.8. However, the influence of the diffraction increases at a large F-number, such as F16 and F32.

Similar to a blur component caused by an aberration, a blur component caused by a diffraction is generated by imaging of spread light that derives from one point on an object and would otherwise condense at one point on an image capturing plane if there are no aberrations or no diffractions. The blur component is expressed by a point spread function ("PSF"). An optical transfer function ("OTF") obtained by a Fourier transform of the PSF contains frequency component information of the aberration, and can be expressed by a complex number. The MTF is an absolute value or an amplitude component of the OTF, and a phase transfer function ("PTF") is a phase component of the OTF. The MTF and PTF are frequency characteristics of the amplitude and phase components in the image deterioration caused by the aberration. The phase component is expressed as a phase angle as follows where Re(OTF) and Im (OTF) represent a real part and an imaginary part of the OTF.

$$PTF = \tan^{-1}(Im(OTF)/Re(OTF))$$

Thus, the OTF of the image capturing optical system, simply referred to as an "optical system" hereinafter, deteriorates the amplitude component and the phase component of the image, and each point on the object in the deteriorated image becomes asymmetrical as in the coma.

One conventional method for correcting the deteriorated amplitude component (MTF) and deteriorated phase component (PTF) in the deteriorated image uses information of the OTF of the image capturing optical system. This method is also referred to as an image recovery or an image restoration, and a process for correcting (reducing) the deteriorated image using the OTF of the image capturing optical system will be referred to as an "image restoration process" hereinafter. One conventional method of the image restoration process is a convolution method of an image restoration filter in a real space with an input image having an inverse characteristic of the OTF, although it will be described in detail later.

A more accurate OTF of the image capturing optical system is necessary for a more effective image restoration process. The OTF can be obtained through a calculation using design value information on an image capturing optical system. The OTF can be also calculated by Fourier-transforming an intensity distribution of a captured point light source. The OTF that relates to the diffraction can be derived from a theoretically led formula.

The OTF changes according to an image capturing condition, such as an F-number and a focal length (zooming state) of an image capturing optical system, and an image height on an image capturing plane. A data amount to be stored is enormous if the OTF data is stored for each image capturing condition and for each image height. Japanese Patent Laid-Open No. ("JP") 2012-73691 discloses a method for reducing a data amount to be stored by storing coefficient data used to reconstruct an OTF for each image pickup condition and for each image height. However, this method causes a heavy calculation burden so as to reconstruct the OTF for each image height using the coefficient data for one image.

JP 2014-150423 discloses a method for reducing a data amount and a calculation burden of an image restoration filter to be stored, by using a single image restoration filter for each F-number when the F-number is equal to or larger than a predetermined value in an image restoration process that focuses on a diffraction.

The method disclosed in JP 2014-150423 that selects the image restoration filter for each F-number needs to store data of the image restoration filter for each F-number equal to or larger than the predetermined value among F-numbers settable for the image capturing optical system. It is thus difficult to sufficiently reduce a data amount to be stored.

SUMMARY OF THE INVENTION

The present invention provides an image processing apparatus, an image capturing apparatus, etc. which can reduce a data amount to be stored and generate an image in which influence of a diffraction caused by a diaphragm, etc. is well reduced.

An image processing apparatus according to one aspect of the present invention includes an image acquirer configured to acquire a first image generated by image capturing through an image capturing optical system, a filter memory configured to store data about an image restoration filter that is used for an image restoration process and corresponds to a first F-number, an interpolation data memory configured to store interpolation data corresponding to each of a plurality of second F-numbers different from the first F-number, the interpolation data relating to an interpolation proportion in an interpolation process, and an image generator configured to generate, when an image capturing F-number as an F-number for the image capturing is one of the second F-numbers, a second image by performing for the first image a correction process that includes the image restoration process and the interpolation process, using the image restoration filter corresponding to the first F-number and the interpolation data corresponding to the image capturing F-number.

Further features of the present invention will become apparent from the following description of exemplary embodiments with reference to the attached drawings.

BRIEF DESCRIPTION OF THE DRAWINGS

FIGS. 4A and 4B are views for explaining a point spread function ("PSF").

FIGS. 5A and 5B are views for explaining a phase component (MTF) and a phase component (PTF) of an optical transfer function (OTF).

FIGS. 6A to 6C are views illustrating a relationship between a gain characteristic of an inverse filter of an OTF and a gain characteristic of an image restoration filter.

DESCRIPTION OF THE EMBODIMENTS

Figure 1:
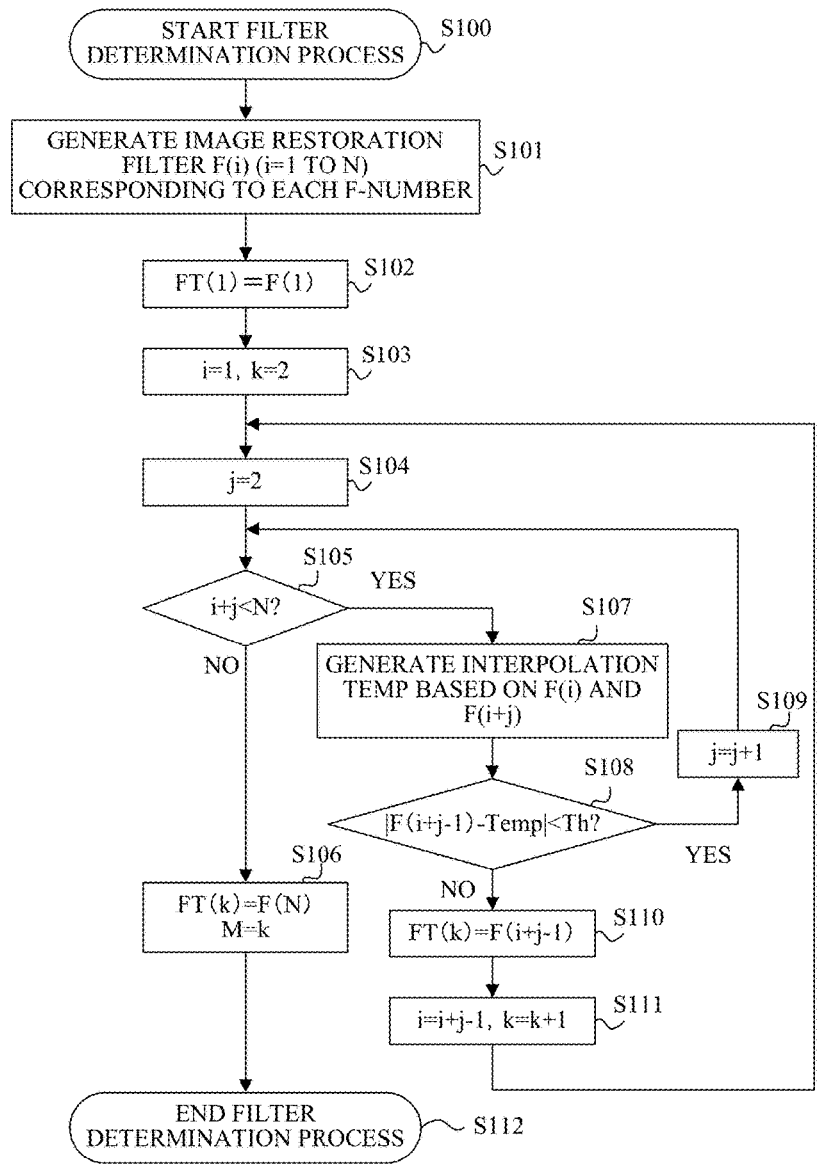
FIG. 1 is a flowchart illustrating an image restoration filter determination process according to a first embodiment of the present invention.
Figure 2:
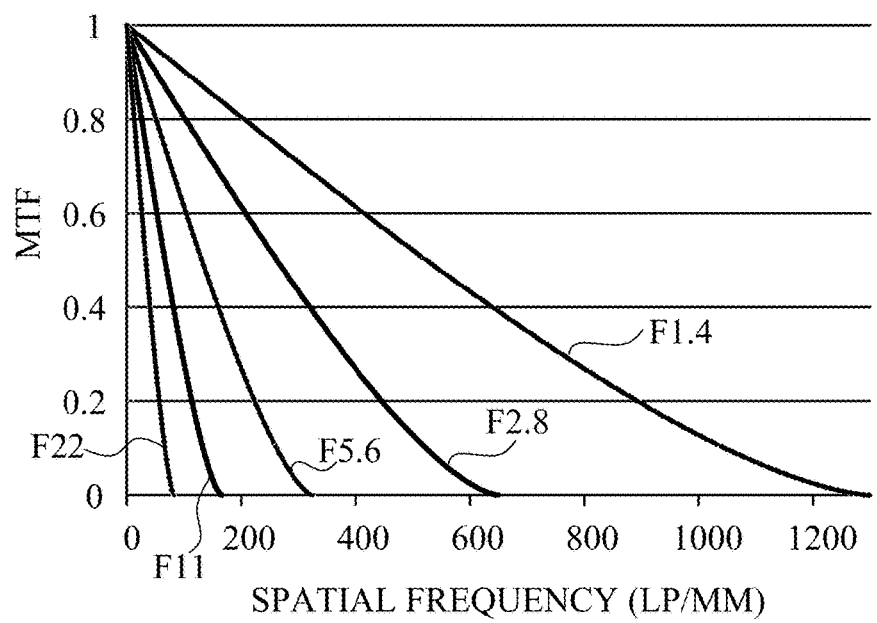
FIG. 2 is a view illustrating a diffraction limit curve.

Referring now to the accompanying drawings, a description will be given of embodiments according to the present invention.

Initially, definitions of terms used for each following embodiment and an image restoration process will be given.

[Input Image]

An input image (first image) is a digital image generated based on an output from an image sensor that has photoelectrically converted an object image formed by an image capturing optical system in an image capturing apparatus. The input image is, for example, a RAW image having information of RGB color components. The input image is an image deteriorated by the OTF that contains an aberration, of the image capturing optical system that includes an optical element, such as a lens and an optical filter.

The image capturing optical system may include a mirror (reflective surface) having a curvature. The image capturing optical system may be attached to and detached from the image capturing optical apparatus. An image capturing system in the image capturing apparatus includes an image sensor, and a signal processing circuit configured to generate the input image using the output of the image sensor. The image sensor includes a photoelectric conversion element, such as a CMOS sensor and a CCD sensor.

The input image and output image may contain an image capturing condition, such as a focal length, an F-number, and an object distance (or image capturing distance) of the image capturing optical system, and various correction information configured to correct the input image.

[Image Restoration Process]

Assume that $g(x, y)$ is the input image (deteriorated image) generated by the image capturing apparatus, $f(x, y)$ is an original image (non-deteriorated image), and $h(x, y)$ is the PSF as a Fourier pair of the OTF. Then, the following expression (1) is established, where * denotes a convolution and $(x, y)$ denotes a coordinate (position) on the input image.

$$g(x,y)=h(x,y)*f(x,y) \qquad (1)$$

When this expression (1) is Fourier-transformed into an expression form on a frequency plane, a product form is obtained for each frequency as in the following expression (2). H is the OTF obtained by Fourier-transforming h as the PSF. G and F are functions obtained by Fourier-transforming g and f. $(u, v)$ is a coordinate on a two-dimensional frequency plane or the frequency.

$$G(u,v)=H(u,v)\cdot F(u,v) \qquad (2)$$

In order to obtain the original image from the deteriorated image, both sides in the expression (2) are divided as in the following expression (3).

$$G(u,v)/H(u,v)=F(u,v) \qquad (3)$$

The restored image corresponding to the original image $f(x, y)$ is obtained by inversely Fourier-transforming $F(u, v)$ or $G(u, v)/H(u, v)$ so as to reconvert it to the real plane.

Assume that R is an inverse Fourier transform of $H^{-1}$. Then, a convolution process with an image on the real plane is performed as in the following expression (4) so as to acquire the restored image as the original image $f(x, y)$.

$$g(x,y)*R(x,y)=f(x,y) \qquad (4)$$

$R(x, y)$ in the expression (4) is an image restoration filter. In general, when the input image is a two-dimensional image, an image restoration filter is also a two-dimensional filter having taps (cells) corresponding to pixels in the two-dimensional image. In principle, as the image restoration filter has more taps (cells), the image restoration precision improves. A practical tap number is set according to a required image quality of an output image, an image processing ability in the image processing apparatus, a spread width of the PSF, etc.

The image restoration filter needs to reflect at least a diffraction characteristic, and quite differs from the conventional edge enhancement filter (high-pass filter) having about three taps in the horizontal and vertical directions. The image restoration filter is generated based on the OTF, and can highly precisely correct both the amplitude and phase components in the deteriorated image or input image.

The actual input image contains a noise component. When the image restoration filter prepared by a complete inverse of the OTF as described above is used, the noise component is remarkably amplified although the deteriorated image is restored. This is because the MTF (amplitude component) of the image capturing optical system is reconverted to 1 over all frequencies, when the noise amplitude is added to the amplitude component of the input image. Although the MTF as the amplitude deteriorated by the image capturing optical system is reconverted to 1, the power spectrum of the noise component is amplified and the noise is amplified according to the restoration gain or the MTF amplification degree. Thus, a well restored image cannot be obtained as an appreciation image from the input image having a noise component. This fact is expressed by the following expressions (5a) and (5b), where N is a noise component.

$$G(u,v)=H(u,v)\cdot F(u,v)+N(u,v) \tag{5a}$$

$$G(u,v)/H(u,v)=F(u,v)+N(u,v)/H(u,v) \tag{5b}$$

A conventional method for restoring an image having a noise component controls a restoration degree according to a signal to noise ratio (SNR) like a Wiener filter expressed in the expression (6), for example.

$$M(u,v) = \frac{1}{H(u,v)} \frac{|H(u,v)|^2}{|H(u,v)|^2 + SNR^2} \tag{6}$$

M(u, v) indicates a frequency characteristic of the Wiener filter, and |H(u, v)| indicates an absolute value (MTF) of the OTF. In each embodiment, the M(u, v) in the expression (6) indicates the frequency characteristic of the image restoration filter. This method limits the restoration gain for each frequency as the MTF becomes smaller, and increases the restoration gain as the MTF becomes larger. In general, the MTF for the image pickup optical system is high on the low frequency side and low on the high frequency side. Therefore, this method restrains the restoration gain substantially on the high frequency side of the image signal.

Since the gain characteristic of the image restoration filter changes according to the SNR term in the expression (6), a parameter C is used for the SNR term so as to simply control the restoration gain (restoration degree) as in the following expression (7).

$$M(u,v) = \frac{1}{H(u,v)} \frac{|H(u,v)|^2}{|H(u,v)|^2 + C} \tag{7}$$

In the expression (7), when C=0, the image restoration filter corresponds to the inverse filter (inverse of the MTF) and the gain of the image restoration filter decreases as C increases. The gain of the image restoration filter is once or less where C>|H(u,v)|−|H(u,v)|² is satisfied.

Referring now to FIGS. 6A to 6C, a description will be given of this case. FIGS. 6A to 6C illustrate a relationship between the inverse filter of the OTF and the gain characteristic of the image restoration filter. The abscissa axis represents a spatial frequency, and the ordinate axis represents a gain. A dotted line denotes the gain characteristic of the inverse filter of the OTF, and a solid line denotes the gain characteristic of the image restoration filter.

As illustrated in FIG. 6A, when the F-number Fn is smaller than a predetermined first F-number Th1 (or when the diaphragm aperture diameter is larger than a predetermined diaphragm aperture diameter), the gain of the image restoration filter is less than a predetermined maximum gain and C can be considered 0. As a result, the inverse of the MTF accords with the gain of the image restoration filter. As illustrated in FIG. 6B, when the F-number Fn is equal to or larger than the predetermined first F-number Th1 and smaller than a predetermined second F-number Th2, the gain of the inverse filter on the high frequency side is larger than the predetermined maximum gain. Hence, C is increased so as to restrict the gain of the image restoration filter on the high frequency side. As illustrated in FIG. 6C, the F-number Fn is equal to or larger than the predetermined second F-number Th2. When C>|H(u,v)|−|H(u,v)|² is established, the gain of the image restoration filter is equal to or smaller than once. The predetermined first and second F-numbers Th1 and Th2 are determined based on a pixel pitch of the image sensor, a characteristic of the optical low-pass filter disposed on the front surface of the image sensor, a maximum value of the restoration gain (restoration degree) of the image restoration filter, and the parameter C for controlling the restoration gain, etc.

Figure 8:
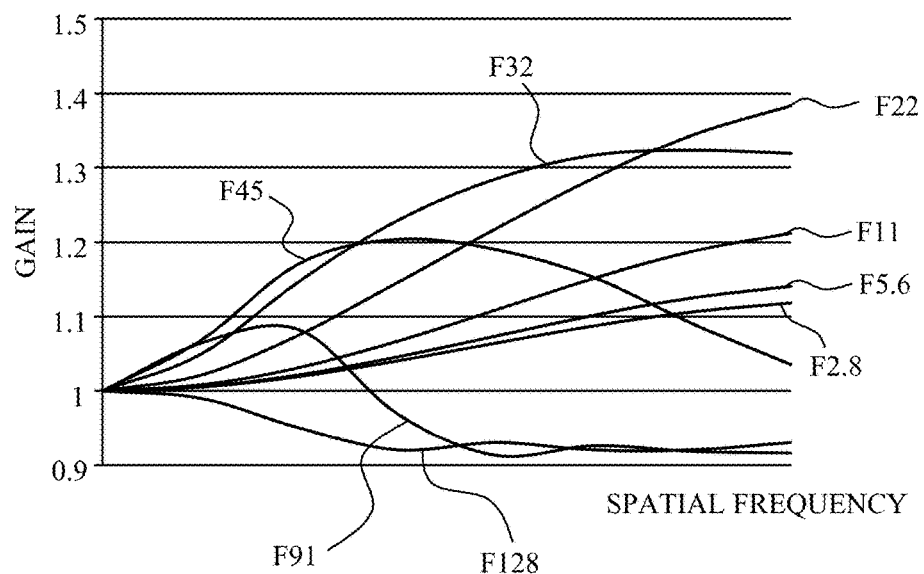
FIG. 8 is a view illustrating the image restoration filter according to the first embodiment.

FIG. 8 illustrates the gain characteristic of the image restoration filter used for each embodiment. The maximum gain of the image restoration filter is set to 1.5, and the pixel pitch of the image sensor is set to 6 μm. At an F-number equal to or smaller than F22, the gain of the image restoration filter monotonously increases. At F32, the gain on the high frequency side is restrained by the maximum gain set to 1.5. At F91, the gain on the low frequency side is equal to or higher than once and the image restoration effect can be obtained but the gain on the high frequency side is lower than once. At F128, the gain is equal to or smaller than once over the entire frequency region, the image restoration effect cannot be obtained, and this image restoration filter cannot be applied as it is.

Thus, the gain characteristic of the image restoration filter significantly varies according to the F-number. A data amount of the image restoration filter to be stored can be reduced by determining the image restoration filter to be stored in the image capturing apparatus by the following method while a change of the gain characteristic is considered.

Next follows a description of the image restoration filter. A tap number of the image restoration filter is determined according to a spread of the PSF caused by the aberrations and diffractions in the image capturing optical system and the required image restoration precision. The image restoration filter of each embodiment is a two-dimensional filter with 11×11 taps, although a larger tap number may be used based on a relationship between the spread width of the PSF and the pixel pitch.

Figure 3:
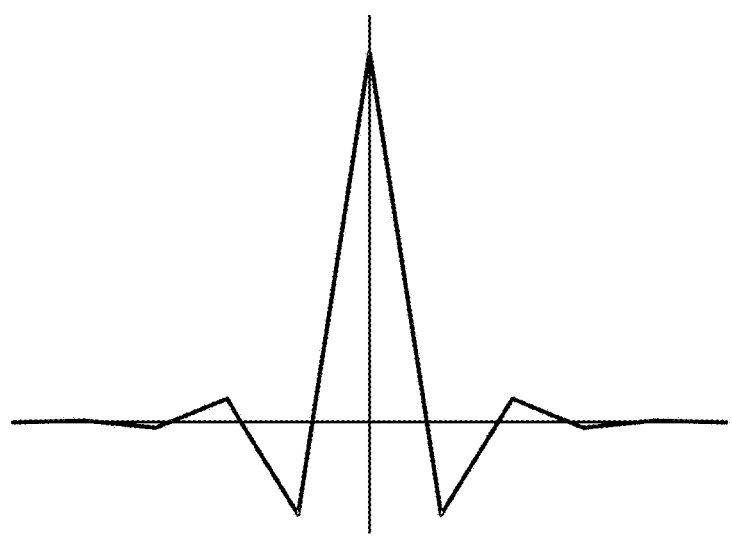
FIG. 3 is a view illustrating a filter coefficient of an image restoration filter according the first embodiment.

A distribution of values (filter coefficients) of the taps in the image restoration filter serves to reconvert the signal values or pixel values that are spatially spread due to the aberrations and the diffractions, to ideally the original one point. Where the diaphragm caused diffraction that is approximately rotationally symmetrical is addressed, the diffraction caused PSF becomes rotationally symmetrical and the distribution of the tap numbers in the image restoration filter also becomes symmetrical as illustrated in FIG. 3. In FIG. 3, the abscissa axis represents a position of the tap, and the ordinate axis represents a value of the tap.

The image restoration process convolutes each tap value in the image restoration filter with each pixel corresponding to each tap in the input image. In the convolution, a certain pixel is accorded with the center of the image restoration filter so as to improve a signal value of the pixel. For each corresponding pixel between the image restoration filter and the input image, the signal value in the input image is multiplied with the tap value in the image restoration filter and the sum total is replaced with the signal value at the center pixel.

Referring now to FIGS. 4A, 4B, 5A, and 5B, a description will be given of characteristics in the real space and the frequency space in the image restoration process. FIG. 4A illustrates a PSF before an image is restored, and FIG. 4B illustrates a PSF after the image is restored. In these figures, the abscissa axis represents the pixel position, and the ordinate axis represents the signal value of the pixel. In FIG. 5A, G (broken line) represents an MTF before an image is restored, and E (alternate long and short dash line) represents an MTF after the image is restored. In FIG. 5B, G (broken line) represents a PTF before an image is restored, and E (alternate long and short dash line) represents a PTF after the image is restored. In these figures, the abscissa axis represents the spatial frequency, and the ordinate axis represents the MTF (0 to 1) or the PTF ($-\pi$ to $\pi$). The PTF before the image is restored has an asymmetrical spread due to the influence of the aberrations and the diffractions, and the PTF has a nonlinear value for the frequency due to this asymmetry. Since the image restoration process amplifies the MTF and zeros the PTF, the PTF after the image is restored becomes symmetrical and has a sharp shape.

When the diffraction caused by the diaphragm that is approximated to a rotational symmetry is addressed, the PSF caused by the diffraction is rotationally symmetrical. Thus, E that is the PTF illustrated in FIG. 5B after the image is restored becomes zero. In other words, the diffraction discussed in each embodiment has no phase shift. Whether or not there is a phase shift, the above image restoration principle works, and the image restoration is effective in each embodiment that focuses on a correction of the diffraction.

The image restoration filter can be obtained by inversely Fourier-transforming the function designed based on the inverse function of the OTF of the image capturing optical system. When the above Wiener filter is used as the image restoration filter, the expression (6) is inversely Fourier-transformed and the image restoration filter in the real space can be prepared in which the input image is actually convoluted with. The image restoration filter used for each embodiment can be properly changed.

The OTF changes according to an image height in the image capturing optical system (a position in the captured image) even when the image capturing condition is the same. Hence, a different image restoration filter is used depending on the image height. The OTF in which the influence of the diffraction is dominant as the F-number increases can be considered uniform (common) irrespective of the image height, if the vignetting influence of the optical system is small.

Each embodiment corrects or reduces the deteriorated component (diffraction blur) caused by the diffraction. Thus, the image restoration filter depends on the F-number and the wavelength of the light and does not depend on the image height. The uniform image restoration filter can be used for the same input image. In other words, the image restoration filter used for each embodiment is generated based on the OTF caused by the diffraction blur generated by the F-number. Regarding the wavelength, the OTF for each color component can be generated by calculating an OTF for each of a plurality of wavelengths, and by performing weighting for each wavelength based on light receiving sensitivity information of the image sensor and the spectral of the conceivable light source. The OTF may be calculated with a predetermined representative wavelength for each color component. The image restoration filter may be generated based on the OTF for each color component.

Therefore, each embodiment that focuses on a correction of the diffraction previously stores a plurality of image restoration filters depending on the F-number, and processes the same input image with a uniform image restoration filter according to the image capturing condition.

First Embodiment

Figure 7:
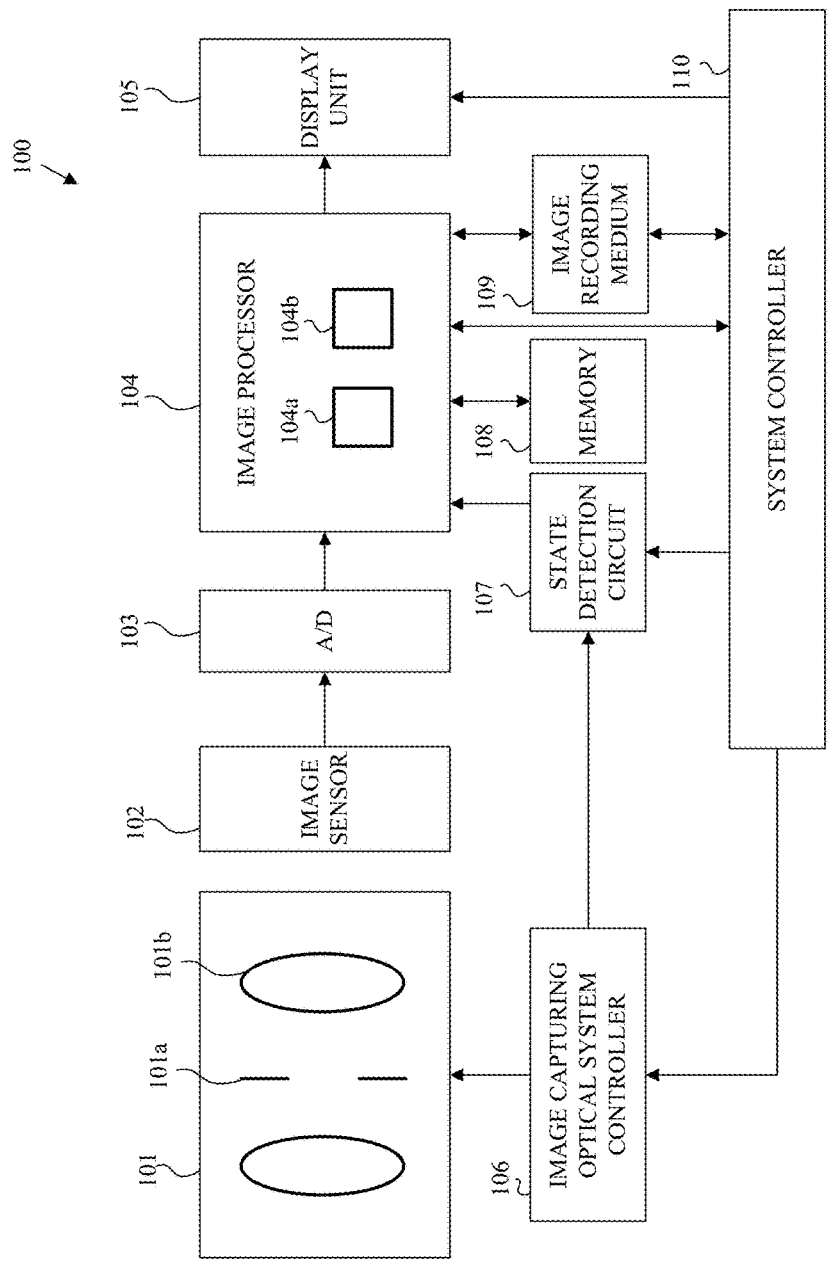
FIG. 7 is a block diagram illustrating a configuration of an image capturing apparatus according to the first embodiment.

FIG. 7 illustrates a configuration of an image capturing apparatus 100 that includes an image processing apparatus according to the first embodiment of the present invention. In the image capturing apparatus 100, an image capturing optical system 101 that includes a diaphragm 101a and a focus lens 101b images light from an unillustrated object, and forms an object image on the image sensor 102. The F-number of the image capturing optical system 101 is set by the diaphragm 101a. A plurality of predetermined F-numbers can be set by increasing and decreasing an aperture diameter in the diaphragm 101a.

The image sensor 102 photoelectrically converts the object image formed by the image capturing optical system 101 and outputs an analog image signal. The analog image signal output from the image sensor 102 is converted into a digital image signal by an A/D converter 103, and the digital image signal is input to the image processor 104.

The image processor 104 generates a captured image as a RAW image by performing various image processing for the digital image signal. The image processor 104 as the image processing apparatus obtains the generated captured image as an input image (first image) that is to receive a correction process that includes the above image restoration process and the following interpolation process. The image processor 104 includes an image acquirer configured to acquire the captured image.

The image processor 104 acquires information on an image capturing condition of the image capturing apparatus 100 from a state detection circuit 107. The image capturing condition includes an F-number of the image capturing optical system 101 in image capturing (referred to as an "image capturing F-number" hereinafter), and a focal length when the image capturing optical system 101 includes a zoom lens, and an object distance (or an image capturing distance) corresponding to the position of the focus lens 101b, etc.

The state detection circuit 107 can obtain information on the image capturing condition directly from a system controller 110, and the information on the image capturing condition of the image capturing optical system 101 can also be obtained from an image capturing optical system controller 106 configured to control an operation of the image capturing optical system 101.

A memory (storage) 108 stores or saves data of a plurality of image restoration filters that are uniform to the image heights (positions in the captured image) and different according to the F-number. The uniform image restoration filter to the image heights means that the same image restoration filter or the image restoration filter having the same two-dimensional distribution in tap number and tap value (filter coefficients) is applied to (convoluted with) those pixels at different image heights. The data of the image restoration filters may be direct data of these image restoration filters, or data for generating the image restoration filters, such as the OTF data. The memory 108 in this embodiment stores the direct data of the image restoration filter.

Among a plurality of F-numbers smaller than a predetermined F-number (first F-number) which are referred to as "second F-numbers or open side F-numbers" hereinafter among a plurality of F-numbers settable by the image capturing optical system 101, the memory 108 stores or saves interpolation data relating to an interpolation proportion for each open side F-number. The interpolation data is data used to acquire the interpolation proportion used for the interpolation process, and may be direct data of the interpolation proportion or data of a formula (function) used to calculate the interpolation proportion corresponding to the open side F-number. The memory 108 in this embodiment stores data of the interpolation proportion itself. The memory 108 corresponds to a filter memory and an interpolation data memory.

The memory 108 may be provided in the lens apparatus having the image capturing optical system 101.

An image processor 104 includes a data selector 104a and a correction processor 104b. The data selector 104a acquires an image restoration filter according to the F-number using data of the image restoration filter stored in the memory 108. When the image capturing F-number is the open side F-number, the data selector 104a acquires an interpolation proportion corresponding to the open side F-number based on the image restoration filter acquired stored in the memory 108. When the image capturing F-number is not the open side F-number, the correction processor 104b generates a restored image (third image) by performing the image restoration process for the captured image using the image restoration filter acquired by the data selector 104a. When the image capturing F-number is the open side F-number, the correction processor 104b generates a restored image (second image) by performing the image restoration process that includes the image restoration process and the interpolation process for the captured image using the image restoration filter acquired by the data selector 104a and the interpolation proportion. The data selector 104a and the correction processor 104b correspond to the image generator.

The output image (restored image) generated by the image processor 104 is recorded at a predetermined format in an image recording medium 109, such as a semiconductor memory and an optical disc. The display unit 105 performs a predetermined display process for the output image, and displays a display image after the display process is performed.

The system controller 110 controls all operations and processes by the thus configured image capturing apparatus 100. The image capturing optical system controller 106 controls driving of the diaphragm 101a and the focus lens 101b in the image capturing optical system 101 in accordance with a command from the system controller 110.

The image capturing optical system 101 may include an optical filter, such as an optical low-pass filter and an infrared cut filter. When the optical filter affects the characteristic of the OTF, such as an optical low-pass filter, the image restoration filter that reduce or eliminates the influence may be generated. The infrared cut filter also affects the PSF integrated values of the spectral wavelengths, in particular the R channel in the PSF, and thus the image restoration filter may reduce or eliminates this difference. The pixel opening shape in the image sensor 102 also affects the OTF, and thus the image restoration filter may reduce or eliminates this difference.

The image capturing optical system 101 may be integrated with or detached from and attached to the image capturing apparatus 100.

Referring now to the flowchart illustrated in FIG. 1, a description will be given of a (filter determination) process configured to determine an image restoration filter stored in the memory 108 performed by the image processor 104. The image processor 104 as an image processing computer executes this process in accordance with an image processing program as a computer program.

In the step S100, the image processor 104 that has started this process generates an image restoration filter F(i) corresponding to each of a plurality of F-number i (i=1 to N) settable in the diaphragm 101a in the step S101.

Next, in the step S102, the image processor 104 determines that the image restoration filter F(1) corresponding to the minimum F-number (i=1) among all F-numbers as a representative image restoration filter FT(1) to be stored in the memory 108.

Next, in the steps S103 and S104, the image processor 104 initializes variables i, k, and j. Each of the variables i, k, and j is a natural numbers, and has an initial value of i=1, k=2, and j=2.

Next, in the step S105, the image processor 104 determines whether i+j<N is satisfied, and moves to the step S106 if i+j≥N is satisfied. In the step S106, the image processor 104 sets F(N) to a representative image restoration filter FT(k), stores an k=M-th image restoration filter in the memory 108, and ends this procedure in the step S112.

When i+j<N is satisfied in the step S105, the image processor 104 moves to the step S107. In the step S107, the image processor 104 generates a Temp filter based on image restoration filters F(i) and F(i+j), such as F(1) and F(3). More specifically, the image processor 104 generates the Temp filter, such as F(2) through a linear interpolation using F(i) and F(i+j). The linear interpolation will be described in detail later. The image processor 104 that has generated the Temp filter moves to the step S108.

In the step S108, the image processor 104 determines whether the similarity degree |F(i+j−1)−Temp| between the image restoration filter F(i+j−1) generated in the step S101 and the image restoration filter Temp generated in the step S107 is smaller than a threshold Th. For example, the image processor 104 determines whether the similarity between F(2) generated in the step S101 and the Temp filter generated by the interpolation is smaller than the threshold Th. When the similarity is smaller than the threshold Th, the image restoration filter F(i+j−1) can be calculated by the interpolation between F(i) and F(i+j), and it is unnecessary to store it in the memory 108. In this case, the image processor 104 moves to the step S109.

In the step S109, the image processor 104 increments j by 1 as j=j+1 and returns to the step S105, so as to move the process for the next image restoration filter.

In the step S108, when the similarity between the image restoration filter F(i+j−1) and the image restoration filter Temp is equal to or larger than the threshold Th, the image processor 104 moves to the step S110. In the step S110, the image restoration filter F(i+j−1) cannot be calculated by the interpolation between F(i) and F(i+j), and thus the image processor 104 sets the image restoration filter F(i+j−1) to the representative image restoration filter FT(k). Then, the image processor 104 moves to the step S111.

In the step S111, the image processor 104 updates the variables i and j as i=i+j−1 and k=k+1 in order to set an object to be processed to the next image restoration filter, and returns to the step S104.

Figure 9:
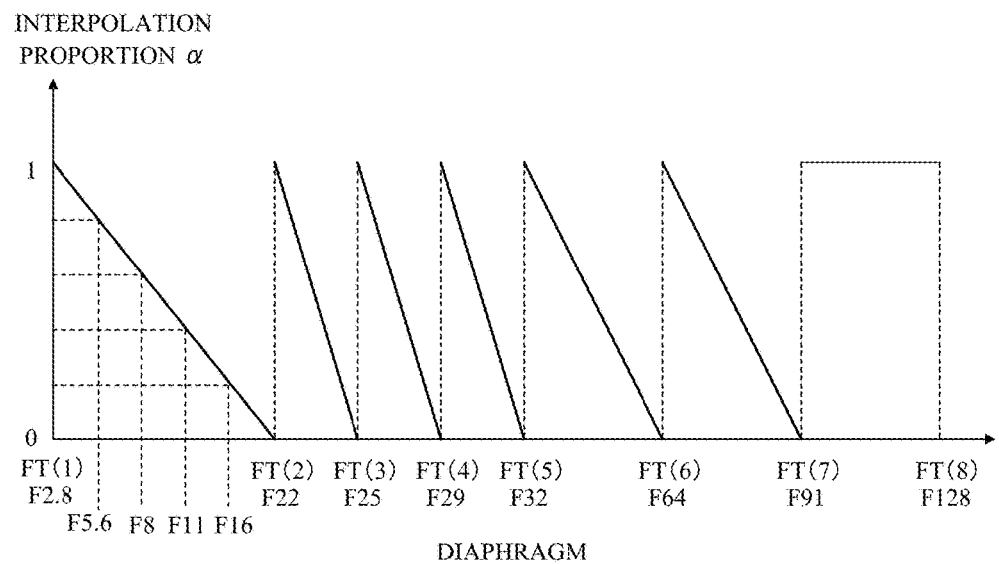
FIG. 9 is a view illustrating an interpolation proportion of the image restoration filter according to the first embodiment.

FIG. 9 illustrates the representative image restoration filter FT(i) determined by the above filter determination process. In FIG. 9, the abscissa axis represents the representative image restoration filter FT(i) and the corresponding F-number. FT(1) corresponding to F2.8 to FT(2) to FT(8) corresponding to F22, F25, F29, F32, F64, F91, and F128 are generated as the representative image restoration filters FT(i).

As illustrated in FIG. 8, the gain of the image restoration filter corresponding to the F-number from F2.8 to F22 (predetermined F-number or the first F-number) monotonously increases. When the image capturing F-number is F2.8 to F22, the F-number Fn corresponds to the open side F-number (second F-number) smaller than the predetermined first F-number Th1 as illustrated in FIG. 6A. FIG. 9 illustrates F2.8, F5.6, F8, F11, and F16 as illustrative open side F-numbers. In this case, a well restored image can be obtained through the correction process (image restoration process and interpolation process) using the representative image restoration filter corresponding to each of F2.8 and F22 and the interpolation proportion α (=0 to 1) corresponding to the image capturing F-number (open side F-number) illustrated in the ordinate axis in FIG. 9. This correction process will be described later.

As illustrated in FIG. 8, the gain of the image restoration filter corresponding to the F-number larger than F22 and smaller than F32 increases on the low frequency side but does not monotonously increase on the high frequency side as the F-number increases. In other words, the image capturing value that is larger than F22 and smaller than F32 corresponds to a case illustrated in FIG. 6A and to an intermediate case illustrated in FIG. 6B in which the F-number Fn is located between the predetermined first F-number Th1 and the predetermined second F-number Th2. In this case, a well restored image cannot be obtained through the correction process with the representative image restoration filter corresponding to the F-number much different from the image capturing F-number. In this case, the representative image restoration filter is stored in the memory 108 for each one-third stage F-number (F25, F29, and F32) from F22.

The image capturing F-number larger than F32 and equal to or smaller than F91 corresponds to a case of FIG. 6B such as the gain of the image restoration filter corresponding to F45 in FIG. 8. In this case, the memory 108 stores the representative image restoration filter for each one stage F-number (F64 and F91) from F32.

The F-number larger than F91 and equal to or smaller than F128 corresponds, as illustrated in FIG. 8, to a case of FIG. 6C in which the gain of the image restoration filter is equal to or smaller than once (when the F-number Fn is equal to or larger than the predetermined second F-number Th2). In this case, the interpolation proportion α is set to 1, and the image restoration filter of F128 is substantially prohibited from being used for the interpolation.

Figure 10:
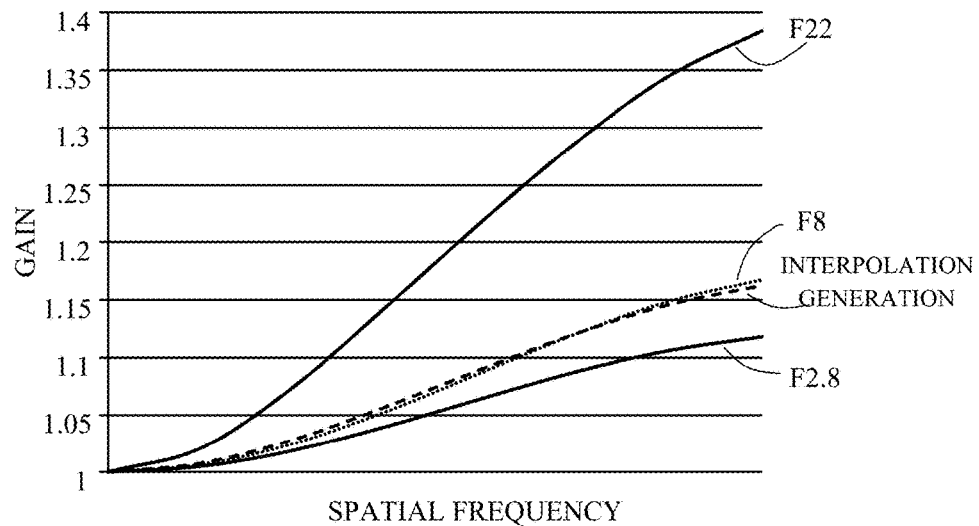
FIG. 10 is a view illustrating a gain characteristic of the image restoration filter generated according to the first embodiment.

FIG. 10 illustrates a gain characteristic of an image restoration filter that corresponds to the F-number between F2.8 and F22 and is generated by the above interpolation process. The abscissa axis represents the spatial frequency, and the ordinate axis represents the gain. A broken line denotes a gain characteristic of an image restoration filter corresponding to F8 generated by the interpolation process using the image restoration filter corresponding to F2.8 and the image restoration filter corresponding to F22. A dotted line denotes a gain characteristic of an image restoration filter corresponding to F8 generated by the step S101 without using the interpolation process. The gain characteristic illustrated by the broken line approximately accords with the gain characteristic illustrated by the dotted line. It is understood from this fact that the well restored image can be obtained with the image restoration filter generated by the interpolation process. A data amount to be stored can be made smaller than that when the memory 108 stores an image restoration filter corresponding to each F-number between F2.8 and F22.

Figure 11:
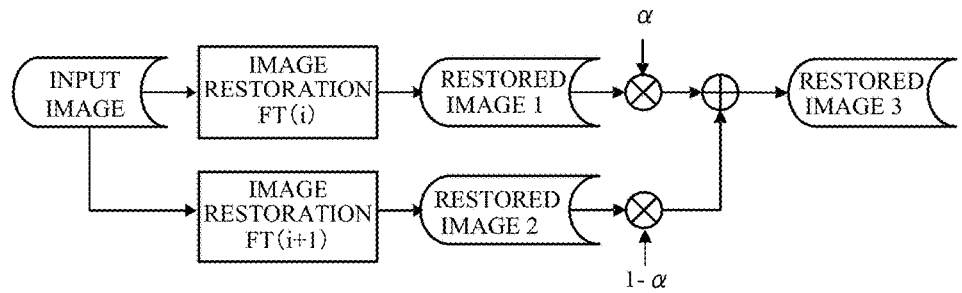
FIG. 11 is a view illustrating an image restoration process according to the first embodiment.

Referring now to FIG. 11, a description will be given of the correction process performed by the image processor 104. The image processor 104 (data selector 104a) selects one of two F-numbers close to the image capturing F-numbers acquired through the state detection circuit 107, which is stored as an F-number corresponding to the representative image restoration filter in the memory 108 based on the image capturing F-number. The image processor 104 reads the representative image restoration filters FT(i) and FT(i+1) corresponding to these two F-numbers out of the memory 108. The image processor 104 (data selector 104a) reads the interpolation proportion α corresponding to the image capturing F-number (open side F-number) out of the memory 108.

Next, the image processor 104 generates restored images 1 and 2 by performing an image restoration process for the captured image (input image) using the two representative image restoration filters FT(i) and FT(i+1). The image processor 104 generates a restored image 3 as an output image by performing the interpolation process (weighted addition) for these restored images 1 and 2 using the interpolation proportion α corresponding to the image capturing F-number. In other words, the image processor 104 generates the restored image 3 equal to an addition of the restored image 1 times α and the restored image 2 times (1−α).

Thus, this embodiment employs a restored image interpolation method configured to obtain an output image using an interpolation process that uses two restored images obtained by an image restoration process with the two representative image restoration filters corresponding to two F-numbers closer to an image capturing F-number and an interpolation proportion corresponding to the image capturing F-number. This method can provide a restored image equivalent with that obtained by the filter interpolation method configured to obtain a restored image by performing the image restoration process for the input image using the image restoration filter generated by the interpolation process that uses the above two representative image restoration filters and the interpolation proportion corresponding to the image capturing F-number. Therefore, the image processor 104 may generate the restored image as the output image by the filter interpolation method instead of the restoration image interpolation method.

This embodiment can provide a well restored image (or perform a good correction process) with a smaller data amount to be stored in an image capturing apparatus for an image restoration process of a captured image.

Second Embodiment

Next follows a description of a second embodiment according to the present invention. The configuration of the image capturing apparatus in this embodiment is the same as that of the image capturing apparatus 100 according to the first embodiment, and those elements which are corresponding elements in the first embodiment will be designated by the same reference numerals.

The first embodiment generates a restored image as an output image by a correction process using representative image restoration filters corresponding to F2.8 and F22 when the image capturing F-number is an F-number, such as F8, located between F2.8 and F22. On the other hand, this embodiment performs a correction process different from that of the first embodiment when the image capturing F-number is one of the plurality of open side F-numbers (second F-numbers) smaller than the predetermined F-number (first F-number, such as F16) between F2.8 and F22. More specifically, this embodiment performs a correction process using the image restoration filter corresponding to the predetermined F-number and an interpolation proportion β for each open side F-number stored in the memory 108. The interpolation proportion β in this embodiment nonlinearly changes for the plurality of open side F-numbers. This embodiment can provide a better correction process than the first embodiment that provides a uniform linear interpolation when the image capturing F-number is an F-number between F2.8 and F22. When the image capturing F-number between F2.8 and F22 is equal to or larger than the predetermined F-number, the same correction process as that described in the first embodiment is performed.

Figure 13:
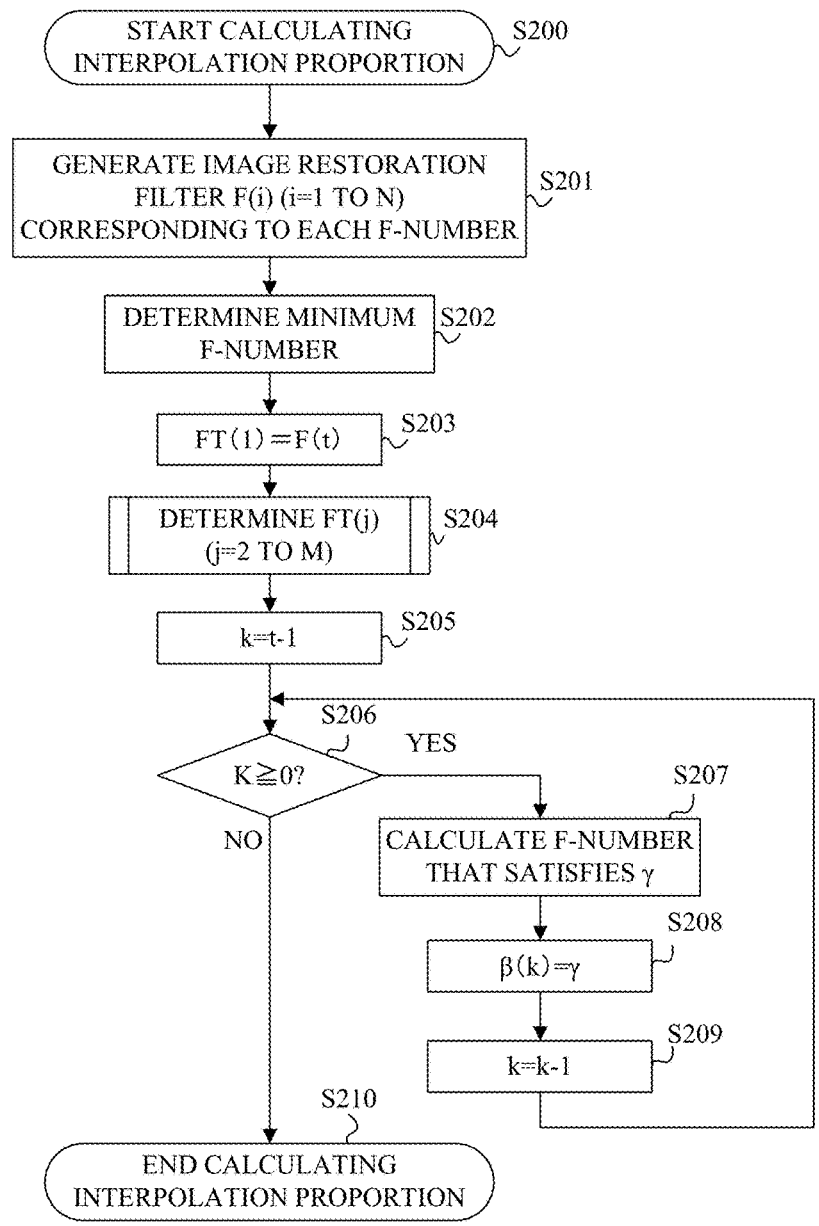
FIG. 13 is a flowchart illustrating an interpolation proportion calculation process according to the second embodiment.

Referring now to a flowchart illustrated in FIG. 13, a description will be given of a process for calculating the interpolation proportion β (interpolation proportion calculation process). The image processor 104 executes this process in accordance with an image processing program as a computer program.

In the step S200, the image processor 104 that has started this process generates the image restoration filter F(i) corresponding to each of F-number i (i=1 to N) settable in the diaphragm 101a in the step S201.

Next, in the step S202, the image processor 104 determines a predetermined F-number (i=t) among all F-numbers as a minimum F-number for a representative image restoration filter stored in the memory 108. The predetermined F-number is determined based on the pixel pitch of the image sensor 102, the characteristic of the optical low-pass filter disposed on the front surface of the image sensor 102, the maximum value of the restoration gain (restoration degree) of the image restoration filter, a parameter (C in the expression (7)) for controlling the restoration gain, etc. This embodiment sets the minimum F-number (predetermined F-number) to F16.

Next, in the step S203, the image processor 104 determines the image restoration filter F(t) corresponding to the predetermined F-number as the representative image restoration filter FT(1).

Next, in the step S204, the image processor 104 determines the representative image restoration filter FT(j) (j=2 to M) to be stored in the memory 108 by the process described in the step S103 to Sill illustrated in FIG. 1 in the first embodiment. The image processor 104 stores the representative image restoration filter determined in the steps S203 and S204, in the memory 108.

In the process subsequent to the step S205, the image processor 104 calculates the interpolation proportion β corresponding to each of the plurality of open side F-numbers smaller than F16.

In the step S205, the image processor 104 determines the open side F-number used to calculate the interpolation proportion β. In the step S206, the image processor 104 determines whether the interpolation proportions β corresponding to all open side F-numbers have been calculated. When the interpolation proportions β corresponding to all open side F-numbers have been calculated, the flow moves to the step S210 so as to end this process.

When the interpolation proportions β corresponding to all open side F-numbers have not yet been calculated in the step 3206, the image processor 104 moves to the step S207. In the step S207, the image processor 104 calculates γ that minimizes |F(k)−[γFT(1)+(1−γ)T]| or that provides [γFT(1)+(1−γ)T] that minimizes a difference from the image restoration filter F(k) calculated in the step S201. T is a through filter in which the input image accords with the output image.

Next, in the step S208, the image processor 104 stores in the memory 108 the calculated γ as the interpolation proportion β(k) corresponding to the open side F-number (i=k).

In the step S209, the image processor 104 decrements k by 1 as k−1 and returns to the step S206. When the interpolation proportions β corresponding to the all open side F-numbers have not yet calculated in the step S206, the image processor 104 repeats the processes of the steps S207 and S208 so as to calculate the interpolation proportion β corresponding to the next open side F-number and to store it in the memory 108.

Figure 14:
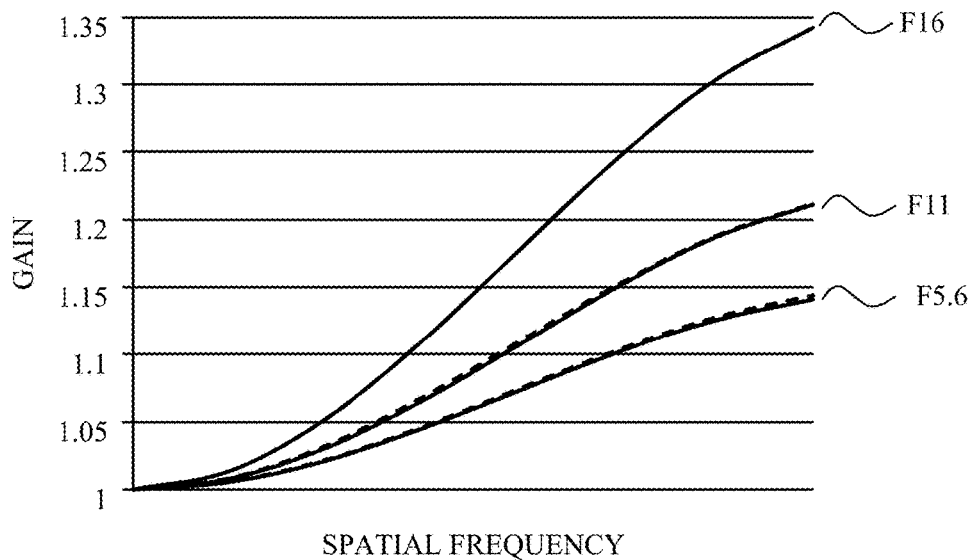
FIG. 14 is a view illustrating a gain characteristic of the image restoration filter generated according to the second embodiment.

FIG. 14 illustrates the illustrative gain characteristic of the image restoration filter determined by the representative image registration filter FT(1) corresponding to the predetermined F-number (F16) and γ (=β) calculated in the step S207. In FIG. 14, the abscissa axis represents the spatial frequency, and the ordinate axis represents the gain. A solid line indicates gain characteristics of the image restoration filters calculated in the step S201 corresponding to the two open side F-numbers (F11 and F5.6) smaller than F16. A broken line indicates gain characteristics of the image restoration filters corresponding to the two open side F-numbers determined by FT(1) and γ(=β).

The gain characteristic of the image restoration filter calculated in the step S201 approximately accords with the gain characteristic of the image restoration filter calculated with FT(1) and γ(=β). It is thus understood that a well restored image can be obtained with image restoration filter calculated with FT(1) and γ(=β) when the image capturing F-number is each open side F-number. A data amount to be stored can be smaller than that when the memory 108 stores the image restoration filter corresponding to each open side F-number.

Figure 15:
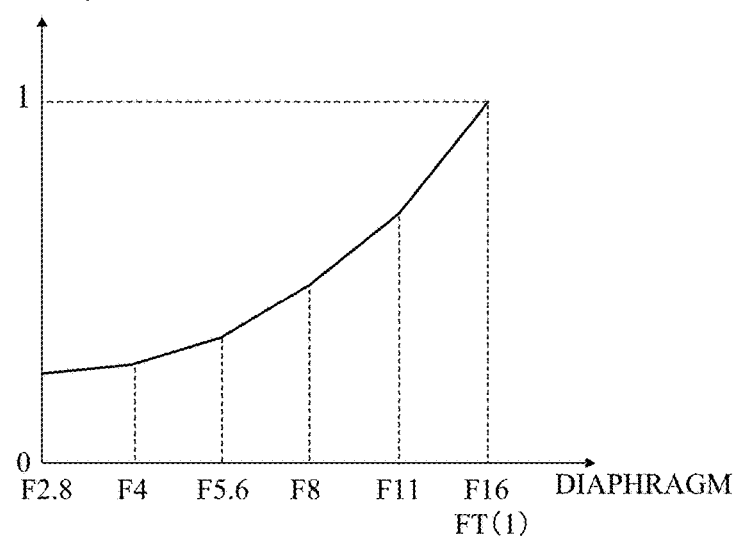
FIG. 15 is a view illustrating an interpolation proportion according to the second embodiment.

FIG. 15 illustrates an interpolation proportion β for each open side F-number (F11, F8, F5.6, F4, and F2.8) calculated by the above interpolation proportion calculation process. As described above, the interpolation proportion β nonlinearly changes as the open side F-number changes.

Figure 12:
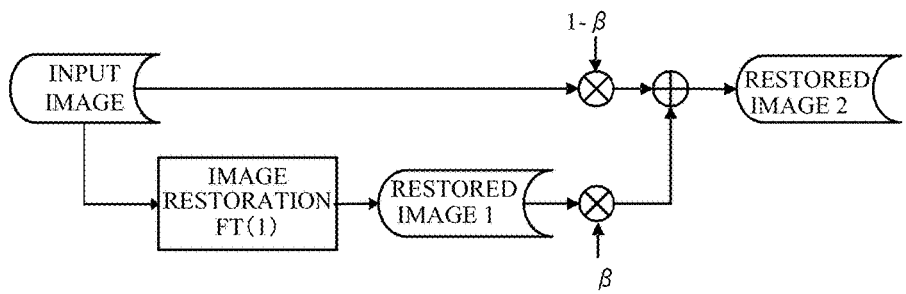
FIG. 12 is a view illustrating an image restoration process according to a second embodiment of the present invention.

Referring now to FIG. 12, a description will be given of a correction process performed by the image processor 104. When the image capturing F-number acquired from the state detection circuit 107 is the open side F-number smaller than the predetermined F-number (F16), the image processor 104 (data selector 104a) reads out of the memory 108, the representative image restoration filter FT(1) corresponding to F16 and the interpolation proportion β corresponding to the open side F-number.

Next, the image processor 104 performs the image restoration process for the captured image (input image) using the representative image restoration filter FT(1) corresponding to F16, and generates the restored image 1. The image processor 104 performs the interpolation process (weighted addition) using the interpolation proportion β for this restored image 1 and the input image, and generates the restored image 2 as the output image. In other words the image processor 104 generates the restored image 2 equal to an addition of the restored image 1 times β and the input image times (1−α).

Thus, this embodiment employs the restored image interpolation method configured to obtain the restored image as the output image using the interpolation process that uses the restored image obtained by the image restoration process with the representative image restoration filter corresponding to the predetermined F-number, the input image, and the interpolation proportion corresponding to the image capturing F-number. This method can provide a restored image equivalent with that obtained by the filter interpolation method configured to obtain a restored image by performing the image restoration process for the input image using the image restoration filter generated by the interpolation process that uses the representative image restoration filter corresponding to the predetermined F-number and the interpolation proportion corresponding to the image capturing F-number. Therefore, the image processor 104 may generate the restored image as the output image by the filter interpolation method instead of the restoration image interpolation method.

This embodiment can provide a well restored image (or perform a good correction process) with a smaller data amount to be stored in an image capturing apparatus for an image restoration process of a captured image.

Now assume that the image capturing F-number is none of the first and second F-numbers. In the first embodiment, in FIG. 9, the interpolation proportion α linearly changes from FT(1) to FT(2). Therefore, the image generator can calculate the interpolation proportion corresponding to the image capturing F-number when two arbitrary interpolation proportions corresponding to the first and second F-numbers are known.

In the second embodiment, in FIG. 15, for example, the interpolation proportion corresponding to the F-number between F4 and F5.6 can be approximately calculated by a linear interpolation using an interpolation proportion corresponding to F4 and F5.6.

The image processor 104 as the image processing apparatus in the first and second embodiments is included in the image capturing apparatus 100, but the image processing apparatus may be configured as a personal computer separately from the image capturing apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-161901, filed on Aug. 19, 2015, which is hereby incorporated by reference herein in its entirety.

What is claimed is:

1. An image processing apparatus which performs a correction process for an image generated by image capturing through an image capturing optical system the image processing apparatus comprising:
  a memory configured to store multiple filters corresponding to mutually different F-numbers of the image capturing optical system; and
  an image processing circuit configured to perform diffraction correction for the image by using a filter, of the multiple filters stored in the memory, corresponding to the F-number used in capturing the image,
  wherein the F-numbers corresponding to the multiple filters stored in the memory are F-numbers, of F-numbers which are settable in capturing the image, included in a predetermined range, and
  wherein the image processing circuit
  performs the diffraction correction for the image by using a filter corresponding to an F-number close to the F-number used in capturing the image when the F-number used in capturing the image is included in the predetermined range and
  performs the diffraction correction for the image by using a predetermined filter of the multiple filters when the F-number used in capturing the image is not included in the predetermined range.

2. The image processing apparatus according to claim 1, wherein the predetermined range indicates multiple F-numbers less than or equal to a first F-number, and
  wherein the image processing circuit performs as the diffraction correction for the image by using a filter corresponding to the first F-number when the F-number used in capturing the image is larger than the first F-number.

3. The image processing apparatus according to claim 1, wherein the predetermined range indicates multiple F-numbers larger than or equal to a first F-number, and
  wherein the image processing circuit performs the diffraction correction for the image by using a filter corresponding to the first F-number when the F-number used in capturing the image is less than the first F-number.

4. The image processing apparatus according to claim 3, wherein the image processing circuit performs a weighted addition of an image obtained by performing the diffraction correction for the image by using a filter corresponding to the first F-number when the F-number used in capturing the image is less than the first F-number and the image before performing the diffraction correction.

5. The image processing apparatus according to claim 4, wherein a ratio of the weighted addition is set depending on the F-number used in capturing the image.

6. The image processing apparatus according to claim 5, wherein the ratio of the weighted addition nonlinearly varies depending on the F-number used in capturing the image.

7. The image processing apparatus according to claim 1, wherein the predetermined range indicates F-numbers larger than or equal to a first F-number and less than or equal to a second F-number which is larger than the first F-number,
  wherein the image processing circuit
  performs the diffraction correction for the image by using a filter corresponding to the first F-number when the F-number used in capturing the image is less than the first F-number, performs the diffraction correction for the image by using a filter corresponding to the second F-number when the F-number used in capturing the image is larger than the second F-number.

8. The image processing apparatus according to claim 1, wherein the multiple filters have mutually different gain characteristics in which gains change with spatial frequency in mutually different manners.

9. The image processing apparatus according to claim 8, wherein the multiple filters are based on an optical transfer function of the age capturing optical system.

10. An image capturing apparatus comprising:
   an image capturer configured to generate an image by image capturing through an image capturing optical system; and
   an image processing apparatus which performs a correction process on the image,
   wherein the image processing apparatus includes:
      a memory configured to store multiple filters corresponding to mutually different F-numbers of the image capturing optical system; and
      an image processing circuit configured to perform a diffraction correction for the image by using a filter, of the multiple filters stored in the memory, corresponding to the F-number used in capturing the image,
   wherein the F-numbers corresponding to the multiple filters stored in the memory are F-numbers, of F-numbers which are settable in capturing the image, included in a predetermined range, and
   wherein the image processing circuit
      performs the diffraction correction for the image by using a filter corresponding to an F-number close to the F-number used in capturing the image when the F-number used in capturing the image is included in the predetermined range and
      performs the diffraction correction for the image by using a predetermined filter of the a multiple filters when the F-number used in capturing the image is not included in the predetermined range.

11. A method of performing a correction process on an image generated by image capturing through an image capturing optical system, the method comprising the steps of:
   acquiring multiple filters corresponding to mutually different F-numbers of the image capturing optical system; and
   performing a diffraction correction for the image by using a filter, of the multiple filters, corresponding to the F-number used in capturing the image,
   wherein the F-numbers corresponding to the multiple filters are F-numbers, of F-numbers which are settable capturing the image, included in a predetermined range, and
   wherein the performing step
      performs the diffraction correction for the image by using a filter corresponding to an F-number close to the F-number used in capturing the image when the F-number used in capturing the image is included in the predetermined range and
      performs the diffraction correction for the image by using a predetermined filter of the multiple filters when the F-number used in capturing the image is not included in the predetermined range.

12. A non-transitory recording medium configured to store a computer program that enables a computer to execute a process for an image generated by image capturing through an image capturing optical system,
   wherein the process includes the steps of:
      acquiring multiple filters corresponding mutually different F-numbers of the image capturing optical system; and
      performing a diffraction correction for the image by using a filter, of the multiple filters, corresponding to the F-number used in capturing the image,
   wherein the F-numbers corresponding to the multiple filters F-numbers, of F-numbers which are settable in capturing the image, included in a predetermined range, and
   wherein the performing step
      performs the diffraction correction for the image by using a filter corresponding to an F-number close to the F-number used in capturing the image when the F-number used in capturing the image is included in the predetermined range and
      performs the diffraction correction for the image by using a predetermined filter of the multiple filters when the F-number used in capturing the image is not included in the predetermined range.

* * * * *